United States Patent
Adachi et al.

(10) Patent No.: US 10,175,041 B2
(45) Date of Patent: Jan. 8, 2019

(54) MEASURING HEAD AND ECCENTRICITY MEASURING DEVICE INCLUDING THE SAME

(71) Applicant: OLYMPUS CORPORATION, Tokyo (JP)

(72) Inventors: Kanato Adachi, Kawasaki (JP); Terumasa Morita, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/716,566

(22) Filed: Sep. 27, 2017

(65) Prior Publication Data
US 2018/0017382 A1    Jan. 18, 2018

Related U.S. Application Data

(63) Continuation of application No. PCT/JP2015/059612, filed on Mar. 27, 2015.

(51) Int. Cl.
*G01B 11/27* (2006.01)
*G01B 11/26* (2006.01)
(Continued)

(52) U.S. Cl.
CPC ............ *G01B 11/272* (2013.01); *G01B 11/26* (2013.01); *G01B 11/27* (2013.01); *G02B 7/02* (2013.01);
(Continued)

(58) Field of Classification Search
CPC ...... G02B 7/02; G02B 27/30; G02B 21/0016; G02B 21/18; G02B 21/36; G01B 11/272; G01B 11/26; G01B 11/27; H04N 5/2258
See application file for complete search history.

(56) References Cited

U.S. PATENT DOCUMENTS

| 2,701,501 A | * | 2/1955 | Cuny | ...................... G01B 11/26 356/153 |
| 3,533,680 A | * | 10/1970 | Edelstein | ............... G01M 11/04 356/153 |

(Continued)

FOREIGN PATENT DOCUMENTS

| CN | 101639351 A | 2/2010 |
| JP | H03-216511 A | 9/1991 |

(Continued)

OTHER PUBLICATIONS

Liu, B. et al., "Long Working Distance Autocollimating and Microscope Monitoring Instrument", Proceedings of SPIE, Jan. 31, 2013, vol. 8759, 87591D-1-87591D-7, doi:10.1117/12. 2014739, cited in ISR.

(Continued)

*Primary Examiner* — Peter Radkowski
(74) *Attorney, Agent, or Firm* — Scully, Scott, Murphy & Presser, P.C.

(57) ABSTRACT

A measuring head includes a light source unit, a first image pickup element, a second image pickup element, an objective optical system, an optical path splitting element, a common optical path, a first optical path, and a second optical path. The common optical path is located on one side of the optical path splitting element, and the first optical path and a second optical path are located on the other side. The optical path splitting element is disposed at a position where the first optical path and the second optical path intersect. The light source unit and the first image pickup element are disposed at predetermined positions. The second image pickup element is disposed at a position different from the predetermined positions. Each of the predetermined positions is a focal position of the objective optical system or a (Continued)

position conjugate to the focal position of the objective optical system.

15 Claims, 10 Drawing Sheets

(51) Int. Cl.
*G02B 7/02* (2006.01)
*G02B 21/18* (2006.01)
*G02B 21/36* (2006.01)
*G02B 27/30* (2006.01)
*G02B 21/00* (2006.01)
*H04N 5/225* (2006.01)

(52) U.S. Cl.
CPC ......... *G02B 21/0016* (2013.01); *G02B 21/18* (2013.01); *G02B 21/36* (2013.01); *G02B 27/30* (2013.01); *H04N 5/2258* (2013.01)

(56) References Cited

U.S. PATENT DOCUMENTS

| | | | | |
|---|---|---|---|---|
| 3,628,869 A | * | 12/1971 | Clay | G01B 11/26 356/153 |
| 3,721,488 A | * | 3/1973 | Kuhne | G02B 27/40 356/125 |
| 3,782,829 A | * | 1/1974 | Herriott | G01B 11/27 356/127 |
| 3,810,699 A | * | 5/1974 | Courtney-Pratt | G01B 11/26 356/153 |
| 3,936,194 A | * | 2/1976 | Lipkins | G01B 11/26 356/153 |
| 4,199,256 A | * | 4/1980 | Forshufvud | G01S 3/78 356/141.4 |
| 4,423,957 A | * | 1/1984 | Poole | G01B 11/26 356/138 |
| 4,560,274 A | * | 12/1985 | McNeely | G01B 11/26 356/138 |
| 5,085,509 A | * | 2/1992 | Gaffard | B23K 26/043 219/121.79 |
| 5,144,486 A | * | 9/1992 | Hart | G01C 15/004 356/138 |
| 6,301,007 B1 | * | 10/2001 | Hanlon | B23Q 17/22 356/400 |
| 6,583,862 B1 | * | 6/2003 | Perger | G01S 7/4812 356/141.1 |
| 6,674,521 B1 | * | 1/2004 | Segall | G01B 9/10 356/138 |
| 7,099,001 B2 | * | 8/2006 | Miyata | G01B 11/26 356/139.04 |
| 7,298,487 B2 | * | 11/2007 | Hansen | G01N 21/4738 356/445 |
| 7,327,452 B2 | * | 2/2008 | Frank | G01N 21/9501 356/124 |
| 2004/0207835 A1 | * | 10/2004 | Miyata | G01B 11/26 356/153 |

FOREIGN PATENT DOCUMENTS

| | | | | |
|---|---|---|---|---|
| JP | 10176906 A | * | 6/1998 | |
| JP | H10-176906 A | | 6/1998 | |
| JP | 3089261 B2 | | 7/2000 | |
| JP | 2004-045327 A | | 2/2004 | |
| JP | 2004045327 A | * | 2/2004 | |
| JP | 2004-317424 A | | 11/2004 | |
| JP | 2004317424 A | * | 11/2004 | ............ G01B 11/26 |
| JP | 2005121448 A | * | 5/2005 | .......... G01B 11/272 |
| JP | 2010-145313 A | | 7/2010 | |
| JP | 2010145313 A | * | 7/2010 | |

OTHER PUBLICATIONS

International Search Report dated Jun. 9, 2015 issued in International Application No. PCT/JP2015/059612.
English translation of International Preliminary Report on Patentability dated Oct. 12, 2017 together with the Written Opinion received in related International Application No. PCT/JP2015/059612.

* cited by examiner

MEASURING HEAD AND ECCENTRICITY MEASURING DEVICE INCLUDING THE SAME

CROSS-REFERENCE TO RELATED APPLICATION

The present application is a continuation application of International Application No. PCT/JP2015/059612 filed on Mar. 27, 2015, which claims priority to International Application No. PCT/JP2015/059612; the entire contents of which are incorporated herein by reference.

BACKGROUND OF THE INVENTION

Field of the Invention

The present invention relates to a measuring head with a wide measurement range in the measurement axis direction and an eccentricity measuring device including the same.

Description of the Related Art

An eccentricity measuring device is a device for measuring the amount of eccentricity in a subject. Eccentricity can be represented by tilt and shift. For example, when the subject is a plane parallel plate, the amount of tilt can be represented by the angle between the normal to a surface of the plane parallel plate and the reference axis. Furthermore, the amount of shift can be represented by the amount of displacement between the center of the plane parallel plate and the reference axis.

The device that measures the amount of tilt is called autocollimator. As an angle measuring device with an autocollimator, a device described in Japanese Patent No. 3089261 is available.

The device described in Japanese Patent No. 3089261 includes two CCD cameras. One of the CCD cameras is disposed at the focal position of a convex lens. The other CCD camera is disposed at a position different from the focal position of the convex lens. Furthermore, a beam splitter is disposed between an object to be measured and the convex lens. In the device described in Japanese Patent No. 3089261, the amount of tilt and the amount of shift can be obtained.

SUMMARY OF THE INVENTION

In one aspect, a measuring head of the present invention comprises a light source unit, a first image pickup element, a second image pickup element, an objective optical system, an optical path splitting element, a common optical path, a first optical path, and a second optical path, wherein the common optical path is formed from the optical path splitting element toward the objective optical system, the first optical path is formed from the optical path splitting element toward the first image pickup element, the second optical path is formed from the optical path splitting element toward the second image pickup element, the common optical path is located on one side and the first optical path and the second optical path are located on the other side, with the optical path splitting element interposed therebetween, the optical path splitting element is disposed at a position where the first optical path and the second optical path intersect, the light source unit is disposed in the first optical path, the light source unit and the first image pickup element are disposed at predetermined positions, the second image pickup element is disposed at a position different from the predetermined positions, and the predetermined positions are each a focal position of the objective optical system or a position conjugate to the focal position of the objective optical system.

Furthermore, in another aspect, an eccentricity measuring device of the present invention comprises a body, a moving mechanism, a measuring head, a holding member, and a processing device, wherein the measuring head, the holding member, and the moving mechanism are provided in the body, the measuring head and the holding member are positioned such that the measuring head and a subject held by the holding member are located on a measurement axis, the moving mechanism moves at least one of the measuring head and the holding member in a direction along the measurement axis, the processing device is connected to the moving mechanism and the measuring head, and the measuring head is the measuring head of the former aspect.

DETAILED DESCRIPTION OF THE INVENTION

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A measuring head of the present embodiment includes a light source unit, a first image pickup element, a second image pickup element, an objective optical system, an optical path splitting element, a common optical path, a first optical path, and a second optical path. The common optical path is formed from the optical path splitting element toward the objective optical system. The first optical path is formed from the optical path splitting element toward the first image pickup element. The second optical path is formed from the optical path splitting element toward the second image pickup element. The common optical path is located on one side and the first optical path and the second optical path are located on the other side, with the optical path splitting element interposed therebetween. The optical path splitting element is disposed at a position where the first optical path and the second optical path intersect. The light source unit is disposed in the first optical path. The light source unit and the first image pickup element are disposed at predetermined positions. The second image pickup element is disposed at a position different from the predetermined positions. Each of the predetermined positions is a focal position of the objective optical system or a position conjugate to the focal position of the objective optical system.

Figure 1A:
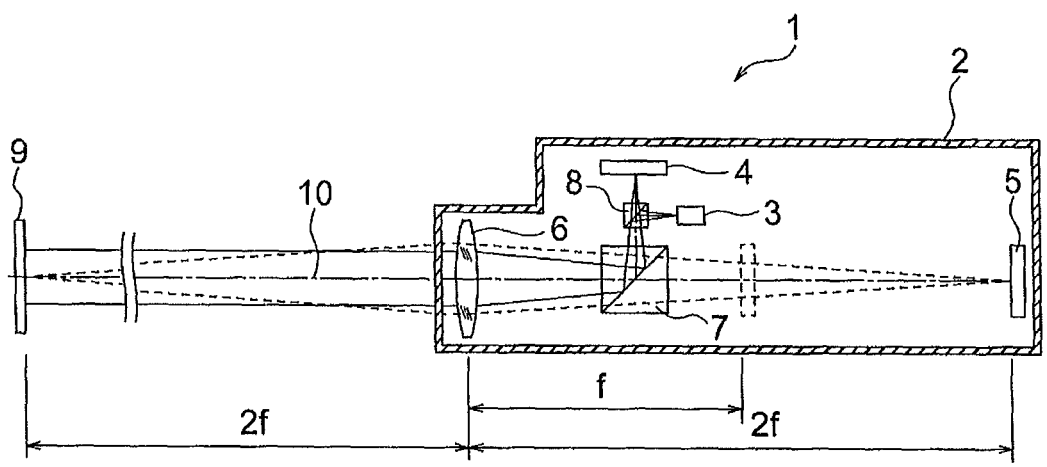
FIG. 1A and FIG. 1B are diagrams showing a measuring head of the present embodiment.
Figure 1B:
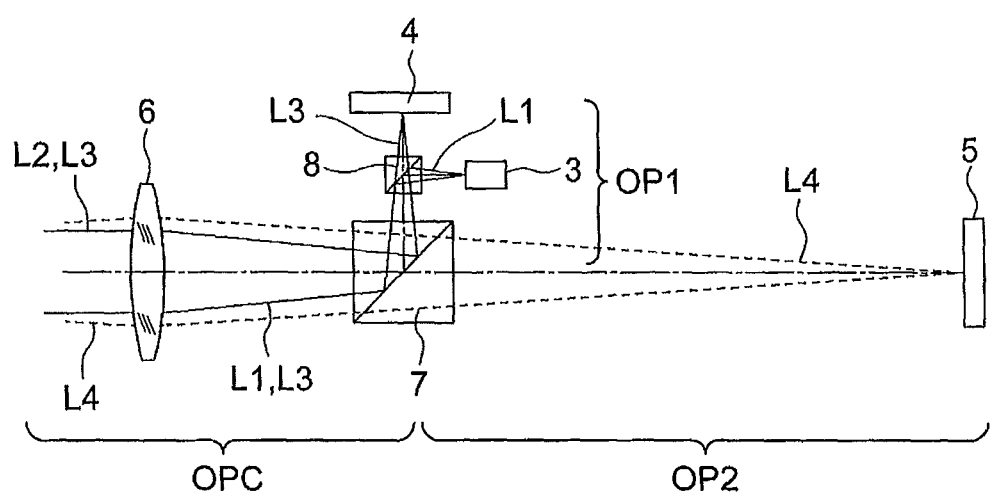

FIG. 1A and FIG. 1B are diagrams showing a measuring head of the present embodiment, in which FIG. 1A is a diagram showing the entire configuration and FIG. 1B is a diagram showing the configuration of an optical system.

A measuring head 1 includes a housing 2. In the housing 2, a light source unit 3, a first image pickup element 4, a second image pickup element 5, an objective optical system 6, and an optical path splitting element 7 are disposed. Furthermore, in order to dispose these elements and the like, a common optical path OPC, a first optical path OP1, and a second optical path OP2 are formed.

The common optical path OPC is formed from the optical path splitting element 7 toward the objective optical system 6. The first optical path OP1 is formed from the optical path splitting element 7 toward the first image pickup element 4. The second optical path OP2 is formed from the optical path splitting element 7 toward the second image pickup element 5.

The common optical path OPC is located on one side and the first optical path OP1 and the second optical path OP2 are located on the other side, with the optical path splitting element 7 interposed therebetween.

The objective optical system 6 and the optical path splitting element 7 are disposed in the common optical path OPC. Furthermore, a subject 9 is disposed in the common optical path OPC. Here, since the objective optical system 6 is disposed closer to the subject 9 side than the optical path splitting element 7, the objective optical system 6 is located closest to the subject 9. That is, nothing is present except the subject 9 in the space from the objective optical system 6 to the subject 9 side.

The light source unit 3, the first image pickup element 4, and a beam splitter 8 are disposed in the first optical path OP1. The second image pickup element 5 is disposed in the second optical path OP2. Furthermore, the optical path splitting element 7 is disposed at the position where the first optical path OP1 and the second optical path OP2 intersect.

The light source unit 3 is disposed in the first optical path OP1. The light source unit 3 is disposed at a predetermined position. The predetermined position is the focal position of the objective optical system 6 or the position conjugate to the focal position of the objective optical system 6. The predetermined position may be displaced approximately by a few hundred micro meters from the focal position of the objective optical system 6 or the position conjugate to the focal position of the objective optical system 6, for example, depending on the amount of aberration produced by the objective optical system 6. The accuracy of these positions may vary with the accuracy required for the measuring head 1.

For example, a laser, a light-emitting diode, a halogen lamp, or a xenon lamp may be used for the light source unit 3. The light source unit 3 preferably includes a point light source. When a surface light source is used for the light source unit 3, an image of the light emitting unit is formed by an optical system and a pin hole is disposed at the image position of the light emitting unit. Also when a point light source is used for the light source unit 3, an image of the point light source is formed and a pin hole may be disposed at the image position of the point light source.

In FIG. 1B, a light-emitting diode is used as the light source unit 3. The wavelength of light emitted from the light-emitting diode is not limited to particular values. Here, red light is emitted from the light-emitting diode.

The beam splitter 8 is disposed in the first optical path OP1. An optical path on the light source unit 3 side and an optical path on the first image pickup element 4 side are formed by the beam splitter 8. A light flux L1 emitted from the light source unit 3 is incident on the beam splitter 8.

The beam splitter 8 is a prism having a half mirror surface. In the half mirror, incident light is split into reflected light and transmitted light. The wavelength band of the reflected light and the wavelength band of the transmitted light are the same. Furthermore, the light intensity of the reflected light and the transmitted light intensity are determined by the reflection characteristics of the half mirror. The beam splitter 8 may be a plane parallel plate having a half mirror surface.

The light flux L1 reflected by the beam splitter 8 is incident on the optical path splitting element 7. The optical path splitting element 7 has an optical surface that separates the incident light into two. An example of such optical surfaces is a half mirror. Here, a prism having a half mirror surface is used as the optical path splitting element 7. The light flux L1 reflected by the optical path splitting element 7 is incident on the objective optical system 6 disposed in the common optical path OPC.

Figure 2:
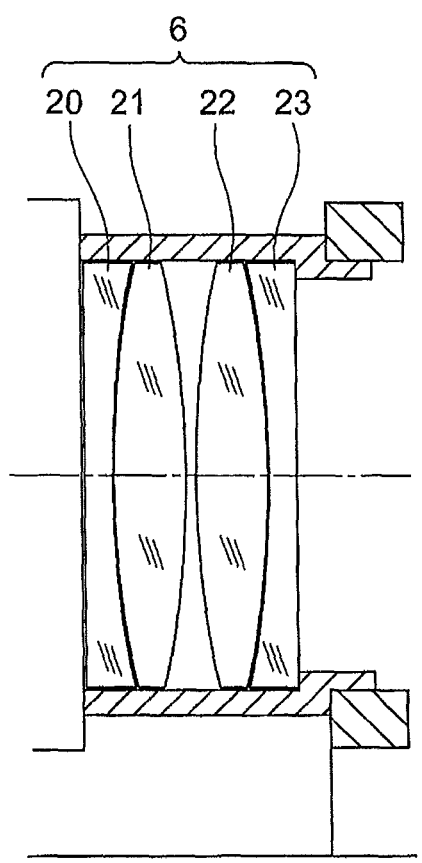
FIG. 2 is a diagram showing a specific example of an objective optical system.

FIG. 2 is a diagram showing a specific example of the objective optical system. As shown in FIG. 2, the objective optical system 6 is configured with four lenses. More specifically, the objective optical system 6 includes a negative meniscus lens 20, a biconvex positive lens 21, a biconvex positive lens 22, and a negative meniscus lens 23. Here, the negative meniscus lens 20 and the biconvex positive lens 21 are cemented together. Furthermore, the biconvex positive lens 22 and the negative meniscus lens 23 are cemented together.

Returning to FIG. 1A and FIG. 1B, a further description will be provided. A light flux L2 is emitted from the objective optical system 6. Here, the light source unit 3 is disposed at the focal position of the objective optical system 6. More specifically, the light emitting unit of the light source unit 3 or the image of the light emitting unit is positioned at the focal position of the objective optical system 6. Thus, the light flux L2 emitted from the objective optical system 6 is a parallel light flux parallel to the measurement axis 10.

The subject 9 is disposed on the common optical path OPC. For the adjustment of the distance from the objective optical system 6 to the subject 9, at least one of the subject 9 and the measuring head 1 is moved.

The subject 9 is irradiated with the light flux L2. At the subject 9, at least part of the light intensity of the irradiating light flux L2 is reflected by the surface of the subject 9. The light flux L3 reflected by the surface of the subject 9 travels through the common optical path OPC toward the objective optical system 6.

The light flux L3 passes through the objective optical system 6 and is incident on the optical path splitting element 7. Part of the light intensity of the light flux L3 is reflected by the optical path splitting element 7. The reflected light flux L3 is incident on the beam splitter 8. Part of the light intensity of the light flux L3 is transmitted through the beam splitter 8. The light flux L3 transmitted through the beam splitter 8 is incident on the first image pickup element 4. The first image pickup element 4 is, for example, a CCD or a CMOS.

A semiconductor position detecting element may be used instead of the first image pickup element 4. The semiconductor position detecting element has a single light-receiving surface. In the semiconductor position detecting element, the output current value changes depending on the position of light incident on the light-receiving surface.

The first image pickup element 4 is disposed at a predetermined position. As described above, the predetermined position is the focal position of the objective optical system 6 or the position conjugate to the focal position of the objective optical system 6.

Although the first image pickup element 4 is disposed in the first optical path OP1, the first image pickup element 4 is disposed at a position indicated by the rectangle defined by dotted lines when the position of the first image pickup element 4 is illustrated on the second optical path OP2 in FIG. 1A. As shown in FIG. 1A, this position coincides with the focal position of the objective optical system 6. Therefore, the light flux L3 is collected on the first image pickup element 4. That is, the image of the light source unit 3 is formed on the first image pickup element 4.

Furthermore, since the subject 9 is irradiated with the light flux L2, it follows that the subject 9 is illuminated with light flux L2. Then, when attention is given to a point on the subject 9, a light flux also travels from this point toward the objective optical system 6. In FIG. 1A and FIG. 1B, a light flux L4 travels from a point on the measurement axis 10 toward the objective optical system 6.

The light flux L4 passes through the objective optical system 6 and is incident on the optical path splitting element 7. Part of the light flux L4 is transmitted through the optical path splitting element 7. The transmitted light flux L4 is incident on the second image pickup element 5. The second image pickup element 5 is, for example, a CCD or a CMOS.

The second image pickup element 5 is disposed at a position different from the predetermined positions. As described above, each of the predetermined positions is the focal position of the objective optical system 6 or the position conjugate to the focal position of the objective optical system 6. Therefore, the subject 9 and the second image pickup element 5 are optically conjugate. Since the subject 9 is irradiated with the light flux L2, the image of the subject 9 is formed on the second image pickup element 5.

In this way, in the measuring head 1, the image of the light source unit 3 is formed on the first image pickup element 4, and the image of the subject 9 is formed on the second image pickup element 5. Using these two images, it is possible to measure the amount of tilt and the amount of shift in the subject 9. In the following description, a plane parallel plate is used as the subject 9.

When the angle formed between the normal to a surface of the plane parallel plate (hereinafter referred to as "the normal to the surface") and the measurement axis 10 is zero, tilt does not occur. In this case, the light flux L3 reflected by the surface of the plane parallel plate is identical to the light flux L2 except that the travelling direction of the light flux L3 is opposite to that of the light flux L2. That is, the light flux L3 is a parallel light flux and travels in parallel with the measurement axis 10. The light flux L3 is incident on a certain position in the first image pickup element 4. As a result, the image of the light source unit 3 is formed at the certain position in the first image pickup element 4.

By contrast, when the angle formed between the normal to the surface and the measurement axis 10 is not zero, a tilt occurs. In this case, the light flux L3 is a parallel light flux but travels at an angle that is not zero relative to the measurement axis 10. Thus, the light flux L3 is incident on a position displaced from the certain position in the first image pickup element 4. As a result, the image of the light source unit 3 is formed at a position displaced from the certain position in the first image pickup element 4.

In this way, it is possible to obtain the amount of tilt by measuring the amount of displacement from the certain position in the first image pickup element 4 for the image of the light source unit 3. The certain position in the first image pickup element 4 can be set, for example, at the center of the first image pickup element 4.

Reflected light is also produced from the back surface of the plane parallel plate. Therefore, the image of the light source unit 3 is formed by the reflected light from the back surface. However, the light intensity of this reflected light is very small. Therefore, the image of the light source unit 3 formed by the reflected light from the back surface can be considered to be undetectable with the first image pickup element 4.

When the amount of displacement between the center of the plane parallel plate and the measurement axis 10 is zero, no shift occurs. By contrast, when the amount of displacement between the center of the plane parallel plate and the measurement axis 10 is not zero, a shift occurs. The position of the image of the light source unit 3 formed on the first image pickup element 4 does not change whether the amount of displacement is zero or the amount of displacement is not zero. Therefore, it is impossible to detect a shift with the first image pickup element 4.

By contrast, in the second image pickup element 5, the image of the surface of the plane parallel plate serving as the subject 9 is formed. Therefore, it is possible to detect the displacement between the center of the plane parallel plate and the measurement axis 10 with the second image pickup element 5. However, since the image of the surface of the plane parallel plate has low contrast, it is difficult to measure the amount of displacement precisely.

Based on this, it is preferable to form an indicator with high contrast at the center of the surface of the plane parallel plate. An example of such indicators is a reticle drawn in black. By doing so, it is possible to acquire the image of the reticle with high contrast with the second image pickup element 5. The indicator is not limited to particular shapes.

When the amount of displacement between the center of the reticle and the measurement axis 10 is zero, no shift occurs and therefore the amount of shift is zero. In this case, the image of the reticle is formed at a certain position in the second image pickup element 5. By contrast, when the amount of displacement between the center of the reticle and the measurement axis 10 is not zero, a shift occurs. In this case, the image of the reticle is formed at a position displaced from the certain position in the second image pickup element 5.

In this way, it is possible to obtain the amount of shift by measuring the amount of displacement from the certain position in the second image pickup element 5 for the image of the reticle. The certain position in the second image pickup element 5 can be set, for example, at the center of the second image pickup element 5.

In this way, according to the measuring head of the present embodiment, it is possible to measure the amount of shift and the amount of tilt of the subject at the same time.

In addition, in the measuring head of the present embodiment, the objective optical system is disposed closest to the subject. That is, nothing is present except the subject in the space from the objective optical system to the subject side. Therefore, according to the measuring head of the present embodiment, it is possible to increase the measurement range in the measurement axis direction. As a result, even when a subject is long in the measurement axis direction, it is possible to measure the amount of shift and the amount of tilt of the subject at the same time.

Furthermore, in the measuring head of the present embodiment, it is preferable that the distance from the subject disposed on the common optical path to the objective optical system be twice the focal length of the objective optical system.

As shown in FIG. 1A, in the measuring head of the present embodiment, the distance from the objective optical system 6 to the subject 9 is twice the focal length of the objective optical system 6. The second image pickup element 5 is disposed accordingly such that the distance from the objective optical system 6 to the second image pickup element 5 is about twice the focal length of the objective optical system 6. By doing so, it is possible to accurately detect the reticle image located at a finite distance.

The distance from the objective optical system 6 to the subject 9 may deviate minutely (to a degree of a few hundred micro meters) from twice the focal length of the objective optical system 6, for example, depending on the amount of aberration produced by the objective optical system 6. The accuracy of these positions may vary with the accuracy required for the measuring head 1.

Furthermore, it is preferable that the measuring head of the present embodiment include a reflective member in the second optical path.

The second optical path OP2 shown in FIG. 1A and FIG. 1B is an optical path that is straight from the optical path splitting element 7 to the second image pickup element 5. Thus, the size of the measuring head 1 is large. It is then preferable that a reflective member be provided in the second optical path.

Figure 3A:
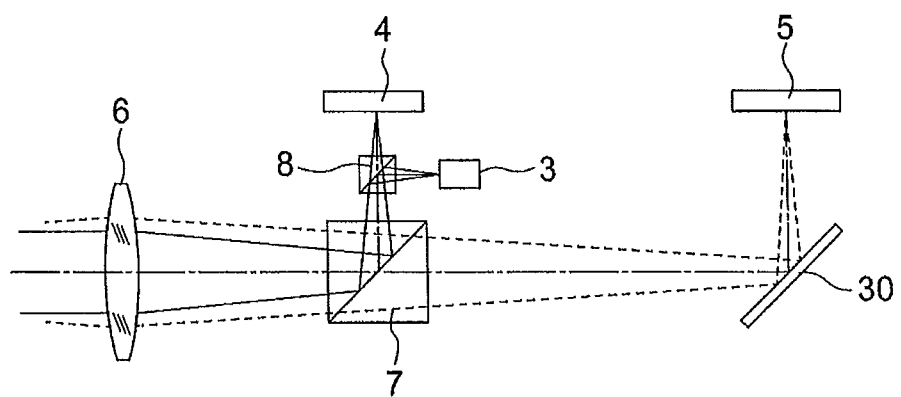
FIG. 3A and FIG. 3B are diagrams showing arrangement examples of a reflective member.
Figure 3B:
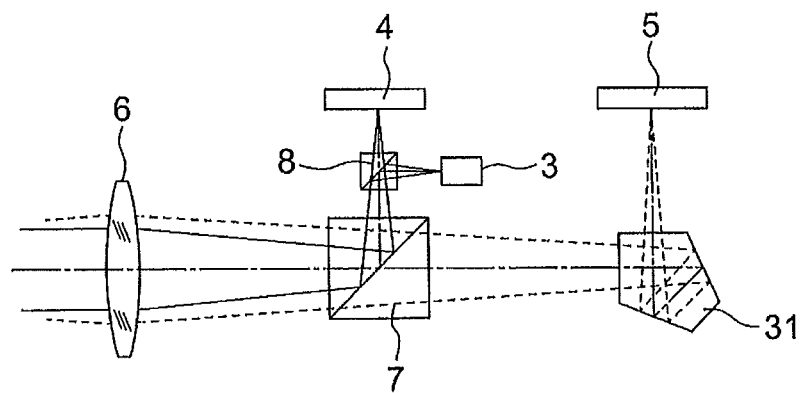

FIG. 3A and FIG. 3B are diagrams showing arrangement examples of the reflective member, in which FIG. 3A is a diagram showing a first modification and FIG. 3B is a diagram showing a second modification. The same configuration as in FIG. 1A is denoted with the same reference numerals and a detailed description thereof will be omitted.

In the first modification, a mirror 30 is disposed in the second optical path OP2. The mirror 30 is disposed whereby the second optical path OP2 is bent once. With this bending, the second optical path OP2 from the optical path splitting element 7 toward the second image pickup element 5 is bent to the first image pickup element 4 side. Therefore, it is possible to reduce the size of the measuring head 1 both in the direction along the measurement axis 10 and in the direction orthogonal to the measurement axis 10.

In the second modification, a pentagonal prism 31 is disposed in the second optical path OP2. The optical path is bent twice by the pentagonal prism 31. With the first bending, the second optical path OP2 from the optical path splitting element 7 toward the second image pickup element 5 is bent to the optical path splitting element 7 side. Then, with the second bending, the second optical path OP2 is bent to the first image pickup element 4 side.

In the second modification, the bend is made to the optical path splitting element 7 side. Thus, in the second modification, it is possible to further reduce the size of the measuring head 1 in the direction along the measurement axis 10.

Furthermore, it is preferable that the measuring head of the present embodiment include a magnifying optical system in the second optical path.

As described above, the amount of shift is obtained by picking up the image of the subject 9 with the second image pickup element 5 and measuring the amount of displacement from the certain position in the second image pickup element 5. Therefore, it is possible to obtain the more precise amount of shift by measuring the position of the image of the subject 9 more precisely. It is then preferable that a magnifying optical system be disposed in the second optical path.

Figure 4:
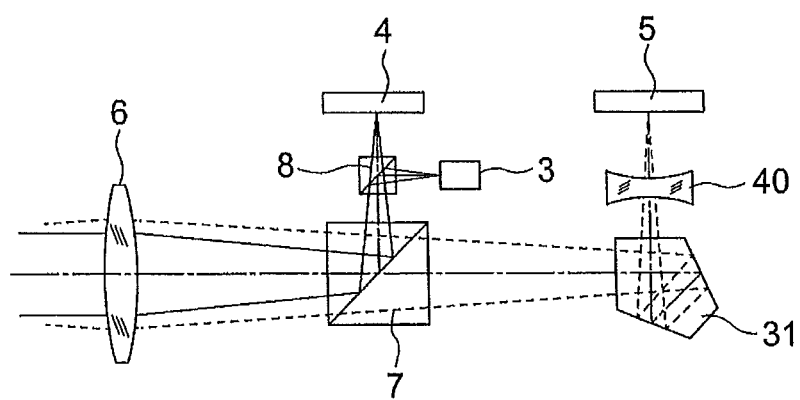
FIG. 4 is a diagram showing an arrangement example of a magnifying optical system.

FIG. 4 is a diagram showing an arrangement example of the magnifying optical system. The same configuration as in FIG. 3B will be denoted with the same reference numerals and a detailed description thereof will be omitted.

As shown in FIG. 4, a magnifying optical system 40 is disposed in the second optical path OP2. More specifically, the magnifying optical system 40 is disposed between the pentagonal prism 31 and the second image pickup element 5. For example, a teleconverter can be used as the magnifying optical system 40. Furthermore, the magnification by the magnifying optical system 40 is, for example, two.

The image of the subject 9 formed on the second image pickup element 5 is enlarged by the magnifying optical system 40. Accordingly, it is possible to measure the position of the image of the subject 9 more precisely. When the magnifying optical system 40 is disposed, the pentagonal prism 31 may not be necessarily disposed. That is, the magnifying optical system 40 may be disposed in the second optical path OP2 in FIG. 1A and FIG. 1B or FIG. 3A.

Furthermore, in the measuring head of the present embodiment, it is preferable that the optical path splitting element be formed with a plane parallel plate and a cylindrical lens is provided in the second optical path.

In FIG. 1A, a prism having a half mirror surface is used for the optical path splitting element 7. However, a plane parallel plate having a half mirror surface may be used as the optical path splitting element 7. Here, when the degree of flatness of the half mirror surface is low, it is difficult to bring the light flux emitted from the objective optical system 6 into parallelism, and, moreover, aberration occurs in the image of the light source unit 3 formed on the first image pickup element 4. Therefore, in order to keep the degree of flatness of the half mirror surface high, it is desirable that the thickness of the plane parallel plate is as large as possible.

However, the optical path splitting element 7 is disposed at a position where the light flux converges. If the plane parallel plate is disposed at an angle in the converging light flux, astigmatism occurs. The amount of astigmatism produced increases as the thickness of the plane parallel plate increases. In this case, since the aberration of the image of the subject also increases, it is difficult to measure the position of the image of the subject precisely. It is then preferable that a cylindrical lens be disposed in the second optical path.

Figure 5:
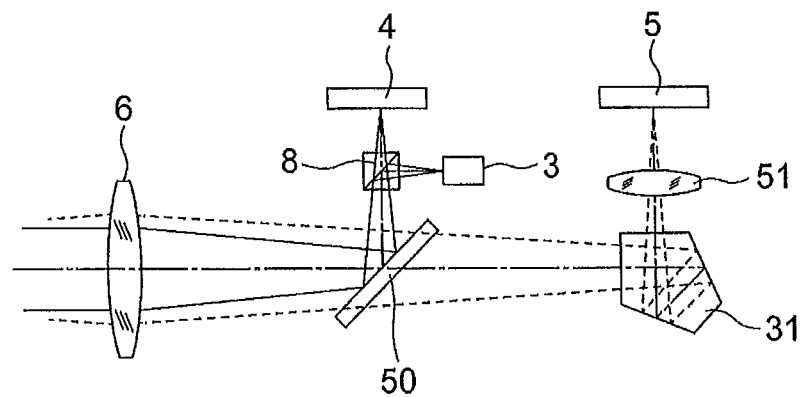
FIG. 5 is a diagram showing an arrangement example of a cylindrical lens.

FIG. 5 is a diagram showing an arrangement example of the cylindrical lens. The same configuration as in FIG. 3B will be denoted with the same reference numerals and a detailed description thereof will be omitted.

In FIG. 5, a plane parallel plate 50 having a half mirror surface is used as the optical path splitting element 7, and a cylindrical lens 51 is disposed in the second optical path OP2. More specifically, the cylindrical lens 51 is disposed between the pentagonal prism 31 and the second image pickup element 5.

With the cylindrical lens 51, it is possible to favorably correct the astigmatism produced in the plane parallel plate

50. As a result, it is possible to measure the position of the image of the subject 9 more precisely even using the plane parallel plate 50 having a large thickness. Furthermore, it is also possible to make the image of the light source unit 3 formed on the first image pickup element 4 with little aberration.

When the plane parallel plate 50 and the cylindrical lens 51 are disposed, the pentagonal prism 31 may not necessarily be disposed. That is, in FIG. 1A and FIG. 1B or FIG. 3A, the plane parallel plate 50 may be disposed instead of the optical path splitting element 7, and the cylindrical lens 51 may be disposed in the second optical path OP2.

Furthermore, in the measuring head of the present embodiment, it is preferable that the optical path splitting element have a dichroic mirror surface.

When an optical element having a half mirror surface is used for the optical path splitting element 7, loss of light intensity occurs in the half mirror surface. An optical element having a dichroic mirror surface is then used for the optical path splitting element 7. Accordingly, it is possible to prevent loss of light intensity in all of light fluxes L1, L2, and light flux L3.

In the dichroic mirror, the incident light is split into reflected light and transmitted light. The wavelength band of the reflected light and the wavelength band of the transmitted light as well as the light intensity of the reflected light and the light intensity of transmitted light are determined by the spectral characteristics of the dichroic mirror.

When red light is used as the light flux L1, the spectral characteristics of the dichroic mirror are set such that light in the wavelength band corresponding to red is reflected and light in the other wavelength band is transmitted. By doing so, the light flux L1 is reflected by the optical path splitting element 7 with almost no loss of light intensity. As a result, the subject 9 can be irradiated with the light flux L2 in a brighter state than when a half mirror is used.

Furthermore, the light flux L3 reflected by the subject 9 is also reflected by the optical path splitting element 7 with almost no loss of light intensity. As a result, the light flux L3 can be incident on the first image pickup element 4 in a brighter state than when a half mirror is used. Accordingly, the image of the light source unit 3 that is brighter than when a half mirror is used is obtained.

Furthermore, it is preferable that the measuring head of the present embodiment include an illumination light source in the second optical path.

When an optical element having a dichroic mirror surface that reflects light in the wavelength band corresponding to red is used for the optical path splitting element 7, and red light is used as the light flux L4, the light is reflected by the optical path splitting element 7. In this case, the light flux L4 is not incident on the second image pickup element 5 and therefore it becomes impossible to measure the amount of shift.

In order to measure the amount of shift, the wavelength band of light in the light flux L4 is made different from the wavelength band in the light flux L1. For this, an illumination light source for producing a light flux L4 is prepared. The light flux L4 is then no longer reflected by the optical path splitting element 7. The illumination light source is not limited as long as the wavelength band of light in the light flux L4 differs from the wavelength band in the light flux L1. For example, a white light source may be used as an illumination light source.

Figure 6A:
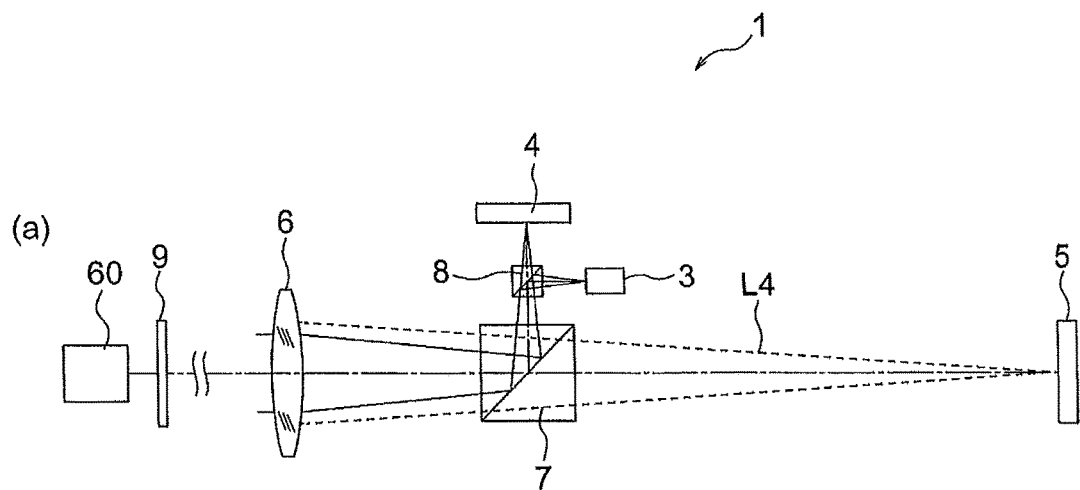
FIG. 6A and FIG. 6B are diagrams showing an arrangement example of an illumination light source.
Figure 6B:
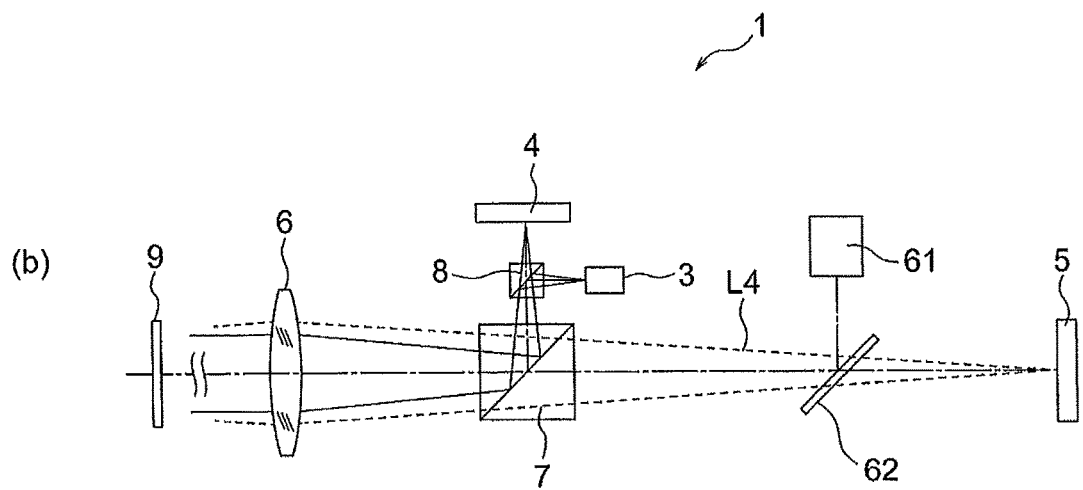

FIG. 6A and FIG. 6B are diagrams showing an arrangement example of the illumination light source, in which FIG. 6A is a diagram showing a first arrangement example and FIG. 6B is a diagram showing a second arrangement example. The same configuration as in FIG. 1B will be denoted with the same reference numerals and a detailed description thereof will be omitted.

In the first arrangement example, the illumination light source is separate from the measuring head. Specifically, as shown in FIG. 6A, an illumination light source 60 is disposed on the opposite side to the measuring head 1 with the subject 9 interposed therebetween.

Illumination light is emitted from the illumination light source 60. When the light flux L1 is red light, the wavelength band of the illumination light is different from the wavelength band of red light. For example, the wavelength band of the illumination light is the wavelength band corresponding to green light. The illumination light from the illumination light source 60 is applied to the subject 9. Since illumination is performed from the opposite side to the objective optical system 6, the subject 9 is subjected to trans-illumination.

The light flux L4 produced from the subject 9 passes through the objective optical system 6 and is incident on the optical path splitting element 7. Here, since the light flux L4 is green light, when the optical path splitting element 7 having a dichroic mirror surface that reflects light in the wavelength band corresponding to red is used, the light flux L4 passes through the optical path splitting element 7. The transmitted light flux L4 is incident on the second image pickup element 5. As a result, the image of the subject 9 is formed on the second image pickup element 5.

In the first arrangement example, since the light flux L4 is light transmitted through the subject 9 and the optical path splitting element 7, loss of light intensity is little. Therefore, when a reticle is formed on the subject 9, it is possible to acquire the image of the reticle with high contrast with the second image pickup element 5. However, it takes time for position adjustment because the illumination light source 60 is separate from the measuring head 1.

In the second arrangement example, the illumination light source is disposed in the measuring head 1. Specifically, as shown in FIG. 6B, the illumination light source 61 is disposed in the second optical path OP2.

Illumination light is emitted from the illumination light source 61. When the light flux L1 is red light, the wavelength band of the illumination light differs from the wavelength band of red light. For example, the wavelength band of the illumination light is the wavelength band corresponding to blue light. The illumination light is reflected by the beam splitter 62 and is incident on the optical path splitting element 7. Here, since the light flux L4 is blue light, the illumination light is transmitted through the optical path splitting element 7. In addition, the illumination light passes through the objective optical system 6 and is applied to the subject 9. Since illumination is performed from the same side as the objective optical system 6, the subject 9 is subjected to reflected light illumination.

The light flux L4 produced from the subject 9 passes through the objective optical system 6 and is incident on the optical path splitting element 7. Here, since the light flux L4 is blue light, the light flux L4 is transmitted through the optical path splitting element 7. The transmitted light flux L4 is incident on the second image pickup element 5. As a result, the image of the subject 9 is formed on the second image pickup element 5.

In the second arrangement example, since the light flux L4 is light reflected by the subject 9, the loss of light intensity is larger than that of the first arrangement example.

However, the illumination light source 61 is integrated with the measuring head 1 and therefore it does not take time for position adjustment.

Furthermore, the eccentricity measuring device of the present embodiment includes a body, a moving mechanism, a measuring head, a holding member, and a processing device. The measuring head, the holding member, and the moving mechanism are provided in the body. The measuring head and the holding member are positioned such that the measuring head and the subject held by the holding member are located on the measurement axis. The moving mechanism moves at least one of the measuring head and the holding member in the direction along the measurement axis. The processing device is connected to the moving mechanism and the measuring head. The measuring head is the measuring head described above.

Figure 7:
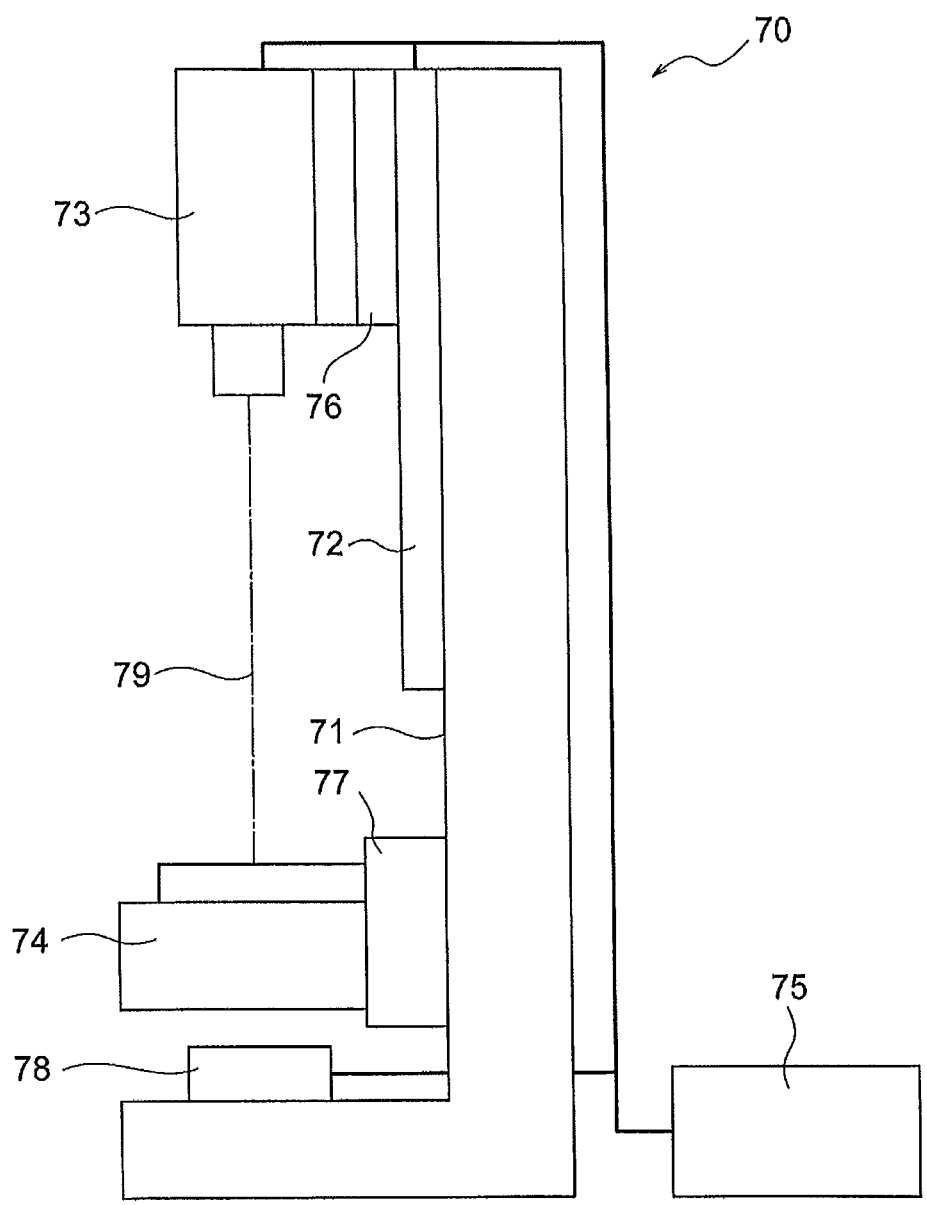
FIG. 7 is a diagram showing an eccentricity measuring device of the present embodiment.

FIG. 7 is a diagram showing the eccentricity measuring device of the present embodiment. An eccentricity measuring device 70 includes a body 71, a moving mechanism 72, a measuring head 73, a holding member 74, and a processing device 75. The moving mechanism 72, the measuring head 73, and the holding member 74 are provided in the body 71.

The moving mechanism 72 is fixed to the body 71. The moving mechanism 72 is, for example, a linear stage. The measuring head 73 is placed on the moving mechanism 72 with the adjustment mechanism 76 interposed therebetween. The holding member 74 is fixed to the body 71 with the adjustment mechanism 77 interposed therebetween. The holding member 74 holds a subject (not shown).

The measuring head 73 and the subject are located on the measurement axis 79. The measuring head 73 and the holding member 74 are positioned so as to achieve this configuration. The adjustment mechanism 76 and the adjustment mechanism 77 are used for this positioning.

However, the measuring head 73 may be directly attached to the moving mechanism 72 and the holding member 74 may be replaced for each subject. By doing so, it is possible to locate the measuring head 73 and the subject held by the holding member 74 on the measurement axis 79. In this case, the adjustment mechanism 76 and the adjustment mechanism 77 become unnecessary.

The moving mechanism 72 moves the measuring head 73 in the direction along the measurement axis. It is thus possible to adjust the distance between the measuring head 73 and the subject. As a result, it is possible to form the image of the subject on the second image pickup element 5. The moving mechanism 72 may be disposed on the holding member 74 side. Furthermore, the moving mechanism may be provided both on the measuring head 73 and on the holding member 74.

The processing device 75 is connected with the moving mechanism 72 and the measuring head 73. Upon an instruction from the processing device 75, the moving mechanism 72 is driven whereby the position of the measuring head 73 is adjusted. Furthermore, information obtained by the measuring head 73 is sent to the processing device 75 and undergoes a variety of processing by the processing device 75.

When an illumination light source is not disposed in the measuring head 73, an illumination light source 78 is provided in the body 71. The illumination light source 78 is disposed at a position opposed to the measuring head 73 with the holding member 74 interposed therebetween. When the illumination light source 78 is provided, the illumination light source 78 is connected to the processing device 75. It is thus possible to control the illumination light source 78.

An example of measurement by the eccentricity measuring device 70 will be described. The subject is the barrel of a single focus optical system. It is assumed that the single focus optical system is configured with five single lenses. Furthermore, in the following description, "linear stage 72" is used instead of "moving mechanism 72".

Figure 8:
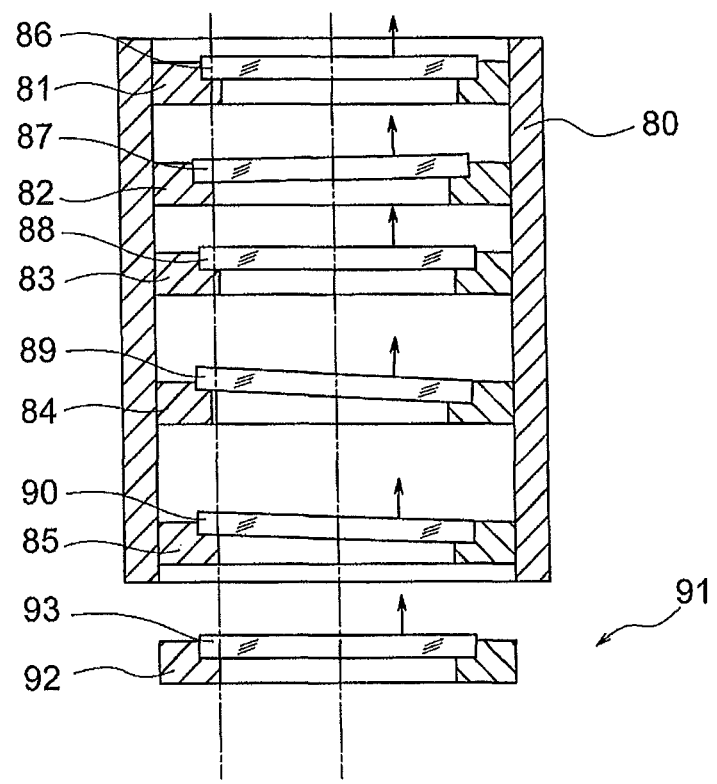
FIG. 8 is a diagram showing a barrel.

FIG. 8 is a diagram showing an example of the barrel. Since the single focus optical system is configured with five single lenses, the number of lens frames that hold the lenses is also five. As shown in FIG. 8, in a barrel 80, a lens frame 81, a lens frame 82, a lens frame 83, a lens frame 84, and a lens frame 85 are inserted.

An opening that holds the lens is formed in the lens frame 81. A surface that receives a lens (hereinafter "receiving surface") is formed in this opening. It is desirable that the angle formed between the normal to the receiving surface and the center axis of the lens frame 81 is zero. However, if there is a machining error, the angle formed between the normal to the receiving surface and the center axis of the lens frame 81 is not zero. In this case, a tilt occurs in the opening.

Furthermore, it is desirable that the opening is formed in the center of the lens frame 81. However, if there is a machining error, the opening is formed at a position displaced from the center of the frame 81. In this case, a shift occurs in the opening.

In this way, tilt and shift occur in the opening of the lens frame 81 due to a machining error. If an image is formed in a state in which the lens is held by the lens frame 81, aberration occurs in the formed image. The lens frame 82, the lens frame 83, the lens frame 84, and the lens frame 85 are similar to the lens frame 81.

If the lens frames are inserted into the barrel 80 in a state in which lenses are held by the lens frames 81 to 85, the imaging performance of the single focus optical system is reduced. It is then important to measure the amount of tilt and the amount of shift in each lens frame.

When the amount of tilt and the amount of shift in each lens frame can be measured, it is possible to machine the lens frame again based on the measurement result. It is thus possible to reduce the amount of tilt and the amount of shift in the lens frame. Alternatively, the measurement result is fed back to the initial machining process. By doing so, it is possible to reduce the amount of tilt and the amount of shift in the lens frame fabricated in the initial machining process.

Figure 9:
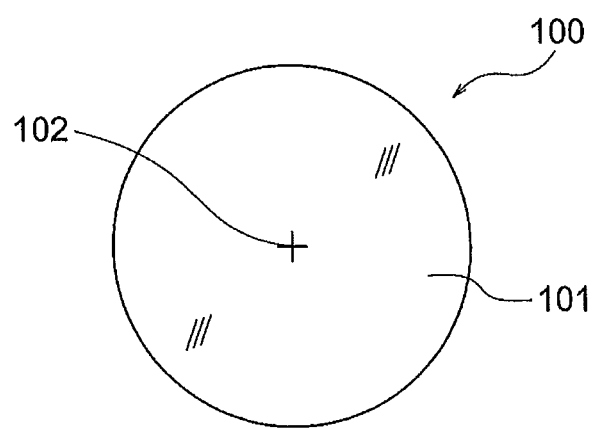
FIG. 9 is a diagram showing a measurement flat plate.

To obtain the amount of tilt and the amount of shift in the lens frame, a plane parallel plate having a reticle formed thereon (hereinafter referred to as "measurement flat plate") is used in the measurement by the eccentricity measuring device 70. FIG. 9 is a diagram showing the measurement flat plate.

A measurement flat plate 100 is a transparent plane parallel plate 101. A reticle 102 is formed on one surface of the plane parallel plate 101. The reticle 102 is formed exactly in the center of the plane parallel plate 101.

Such a measurement flat plate 100 is held by the lens frames 81 to 85. In FIG. 8, a measurement flat plate 86 is held by the lens frame 81, a measurement flat plate 87 is held by the lens frame 82, a measurement flat plate 88 is held by the lens frame 83, a measurement flat plate 89 is held by the lens frame 84, and a measurement flat plate 90 is held by the lens frame 85.

Accordingly, the position of the reticle in the measurement flat plate is substantially equivalent to the amount of shift in the lens frame. Furthermore, the direction of the normal to the surface in the measurement flat plate is substantially equivalent to the amount of tilt in the lens frame.

In the lens frame 81, the opening is shifted rightward, and the normal to the receiving surface faces obliquely upward to the left. In the lens frame 82, the opening is not shifted, and the normal to the receiving surface faces obliquely upward to the left. In the lens frame 83, the opening is shifted rightward, and the normal to the receiving surface faces obliquely upward to the left. In the lens frame 84, the opening is shifted leftward, and the normal to the receiving surface faces obliquely upward to the right. In the lens frame 85, the opening is not shifted, and the normal to the receiving surface faces obliquely upward to the right. As used herein, left, right, up, and down mean top and bottom in the drawing sheets.

Furthermore, a jig 91 is disposed on one side of the barrel 80. The jig 91 is configured with a lens frame 92 and a measurement flat plate 93. The opening of the lens frame 92 is formed with high accuracy. Therefore, the amount of tilt and the amount of shift in the lens frame 92 are both almost zero.

Prior to measurement, the barrel 80 and the jig 91 are held by the holding member 74. In doing so, the barrel 80 and the jig 91 are held such that the barrel 80 is located closer to the measuring head 73 side than the jig 91.

The measuring head 73 is disposed at a position directly facing the barrel 80. The measuring head 73 is moved along the measurement axis 79 by the linear stage 72 at a time of measurement. The linear stage 72 and the measuring head 73 are attached to the body 71 such that the measurement axis 79 forms the right angle relative to the surface of the measurement flat plate 93 on the jig 91. In order to form the right angle, each of the jig 91, the linear stage 72, and the measuring head 73 may be provided with a mechanism for inclination adjustment. This adjustment is performed as necessary. By doing so, it is possible to perform measurement while ensuring the right angle of the measurement flat plate 93 and the measuring head 73. The linear stage 72 is also provided with an adjustment mechanism.

The measuring head 73 is moved to a reference position on the linear stage 72. This reference position is a position representing a mechanical origin. It is thus possible to return the measuring head 73 to the mechanical origin.

A light flux is applied toward the holding member 74. The light flux L1 is emitted from the light source unit 3 of the measuring head 73, and the light flux L2 is applied to the barrel 80 and the jig 91. When an illumination light source is disposed in the measuring head 73, illumination light is applied from this illumination light source to the barrel 80 and the jig 91. When an illumination light source is not disposed in the measuring head 73, illumination light is applied from the illumination light source 78 to the barrel 80 and the jig 91.

Figure 10:
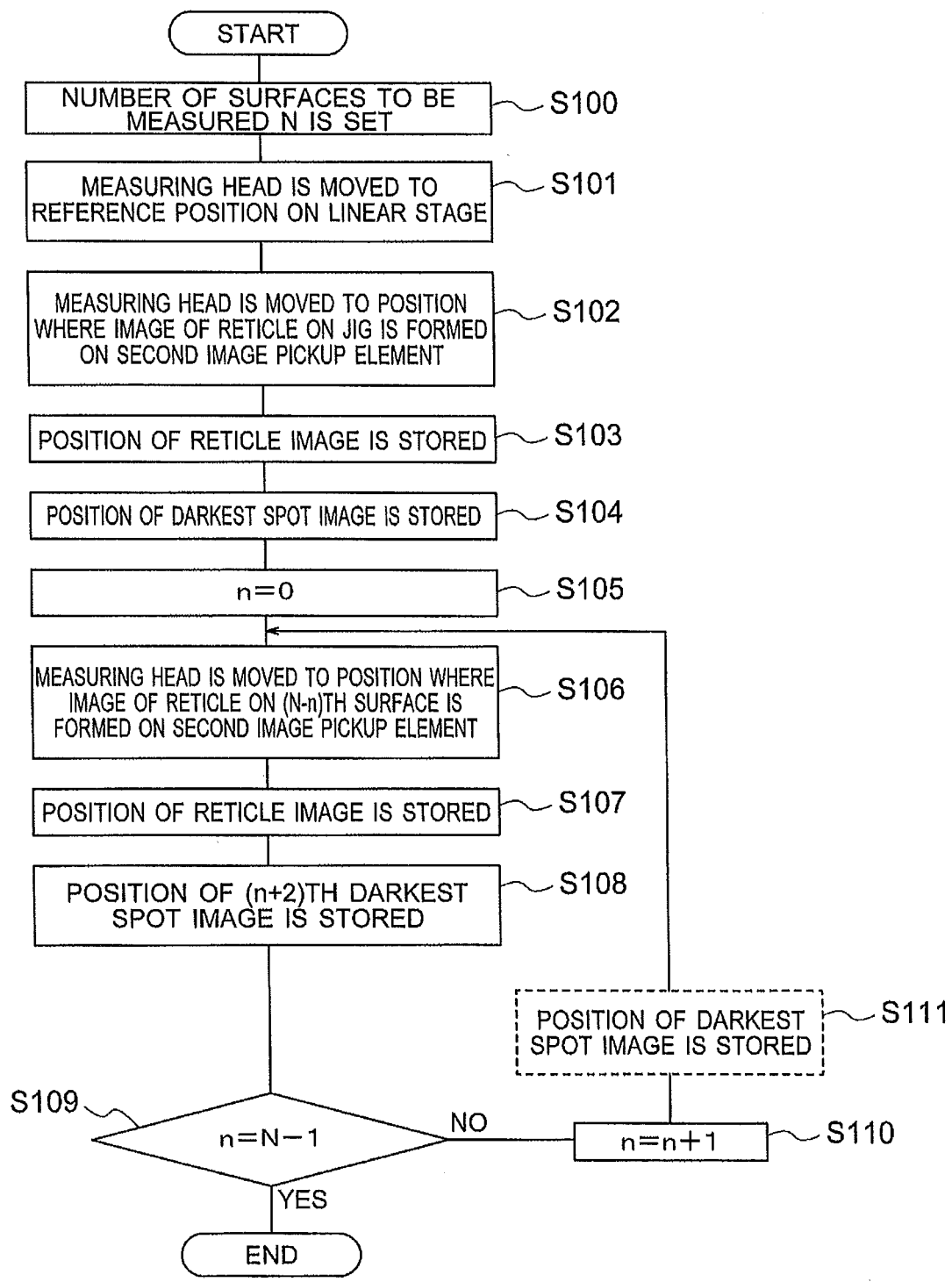
FIG. 10 is a flowchart of a measuring method.

For each of the jig 91 and the barrel 80, measurement of the position of the reticle image and measurement of the position of the image of the light source unit 3 are performed. FIG. 10 is a flowchart of a measuring method.

In step S100, the number of surfaces to be measured is set. The number of surfaces to be measured is determined by the number of measurement flat plates. It is noted that the number of surfaces to be measured does not include the measurement flat plate of the jig. Since the number of measurement flat plates in the barrel 80 is five, N=5 is set. Then, in step S101, the measuring head 73 is moved to the reference position on the linear stage 72. Thus, measurement is ready.

First, measurement is performed for the jig 91. Illumination light is applied to the jig 91 whereby an image Io of the reticle 102 on the measurement flat plate 93 (hereinafter referred to as "reticle image Io") can be formed. Then, in step S102, the measuring head 73 is moved so that the reticle image Io is formed on the second image pickup element 5. Here, the contrast of the reticle image Io may be obtained while the measuring head 73 is moved, and the movement of the measuring head 73 may be stopped when the contrast of the reticle image Io is largest. By doing so, it is possible to automatically focus on the reticle 102.

In this state, a clear reticle image Io is formed on the second image pickup element 5. Then, the image of the reticle image Io is picked up, and the coordinates So($\delta$xo, $\delta$yo) of the reticle image Io are obtained. In step S103, the obtained So($\delta$xo, $\delta$yo) is stored.

By contrast, in the first image pickup element 4, the image of the light source unit 3 (hereinafter referred to as "spot image") is formed. Since the number of measurement flat plates is six, the number of spot images is six. The six spot images are produced by reflection at the surfaces of the measurement flat plates 86 to 90 and 93. The light intensity of the light flux L2 decreases every time it passes through the measurement flat plate. Therefore, the brightness varies among the six spot images.

The brightest spot image of the six spot images is the image produced by reflection from the measurement flat plate located closest to the measuring head 73. By contrast, the darkest spot image is the image produced by reflection from the measurement flat plate located farthest from the measuring head 73.

The measurement flat plate 93 is located farthest from the measuring head 73. Then, the darkest spot image is specified from among the six spot images, and the coordinates To($\varepsilon$xo, $\varepsilon$yo) of the darkest spot image are obtained. In step S104, the obtained To($\varepsilon$xo, $\varepsilon$yo) is stored.

Furthermore, the position Zo(zo) of the measuring head 73 on the measurement axis 79 is stored. The measurement of the position of the reticle image on the jig 91 and the measurement of the position of the spot image are thus finished.

As described above, the amount of shift and the amount of tilt are almost zero in the jig 91. Therefore, it is possible to use So($\delta$xo, $\delta$yo) as the shift origin. Furthermore, it is possible to use To($\varepsilon$xo, $\varepsilon$yo) as the tilt origin.

Subsequently, measurement is performed for the barrel 80. In measurement for the barrel 80, a variable n is used to count the number of times of measurement in the barrel 80. Then, in step S105, the value of n is initialized.

In a state in which the measurement in the jig 91 is finished, the reticle 102 on the measurement flat plate 93 is in focus. Therefore, efficient measurement can be performed when measurement of the position of the reticle image and measurement of the position of the spot image are performed from the measurement flat plate located closest to the measurement flat plate 93. It is noted that the measurement flat plates may be measured in the order from the measurement flat plate located farthest from the measurement flat plate 93, or in a random order.

The measurement flat plate located closest to the measurement flat plate 93 is the measurement flat plate 90. The measurement flat plate 90 is located closer to the measuring head 73 side than the measurement flat plate 93. Then, in step S106, the measuring head 73 is moved in the direction away from the barrel 80 so that a reticle image I$_1$ is formed on the second image pickup element 5. The reticle image I$_1$ is the image of the reticle formed on the measurement flat plate 90. Also at this time, the contrast of the reticle image $I_1$ is obtained, and when the contrast of the reticle image $I_1$ is largest, the measuring head 73 may be stopped moving.

In this state, a clear reticle image $I_1$ is formed on the second image pickup element 5. Then, the reticle image $I_1$ is picked up, and the coordinates $S_1(\delta x1, \delta y1)$ of the reticle image $I_1$ on the measurement flat plate 90 are obtained. In step S107, the obtained $S_1(\delta x1, \delta y1)$ is stored.

Furthermore, the position of the measurement flat plate 90 is the second farthest position from the measuring head 73. Then, the second darkest spot image is specified from among the six spot images, and the coordinates $T_1(\varepsilon x1, \varepsilon y1)$ of the second darkest spot image are obtained. In step S108, the obtained $T_1(\varepsilon x1, \varepsilon y1)$ is stored.

In step S109, the number of times of measurement is confirmed. When n does not agree with N−1, the measurement has not yet finished for all of the measurement flat plates. In this case, step S110 is executed. In step S110, the value of the variable n is incremented.

Here, the coordinates $To_1(\varepsilon xo1, \varepsilon yo1)$ of the darkest spot image may be obtained, and the obtained $To_1(\varepsilon xo1, \varepsilon yo1)$ may be stored. In this case, step S111 is executed. Step S111 is executed as necessary.

The coordinates of the darkest spot image have already been obtained in the measurement in the measurement flat plate 93 (step S104). However, the measurement in the measurement flat plate 90 and the measurement in the measurement flat plate 93 are different in position of the measuring head 73. Therefore, the coordinates measured for the measurement flat plate 90 and the coordinates measured for the measurement flat plate 93 do not always agree. This point will be described later.

Furthermore, the position $Z_1(z1)$ of the measuring head 73 on the measurement axis 79 is stored. The measurement in the measurement flat plate 90 is then finished.

Thereafter, the processing performed for the measurement flat plate 90 is repeatedly performed in the order of the measurement flat plate 89, the measurement flat plate 88, the measurement flat plate 87, and the measurement flat plate 86.

When the coordinates of the reticle in the measurement flat plate 86 and the coordinates of the spot image are finished being stored, the measurement of the position of the reticle image in the barrel 80 and the measurement of the position of the spot image are finished.

The measurement data of the position of the reticle image and the measurement data of the position of the spot image are stored together with the position data of the measuring head 73 into the processing device 75.

It is possible to obtain the amount of tilt and the amount of shift in each lens frame from the measurement data stored in the processing device 75.

The normal to the surface of the measurement flat plate 93 and the measurement axis 79 are preferably parallel to each other. However, it is extremely difficult to bring them into perfect parallelism. In a state in which the normal to the surface of the measurement flat plate 93 and the measurement axis 79 intersect, when the measuring head 73 moves along the measurement axis 79, the measuring head 73 moves also in the direction orthogonal to the normal to the surface of the measurement flat plate 93. Such movement results in an error in measurement of the position of the reticle image and measurement of the position of the spot image. The factors in the error resulting from the movement of the measuring head 73 include pitching and yawing in the measuring head 73.

As described above, when the coordinates of the darkest spot image are measured in the measurement of the measurement flat plate 86 to measurement flat plate 90, it is possible to detect the amount of displacement due to pitching and the amount of displacement due to yawing in the measuring head 73, using the measurement data of the coordinates of the darkest spot image. It is possible to perform eccentricity measurement with high accuracy by correcting the amount of tilt and the amount of shift using the detected amount of displacement.

Although eccentricity measurement in the barrel of the single focus optical system has been described above, it is possible to perform similar eccentricity measurement also for a zoom lens frame.

Furthermore, by using the measuring head 73, it is possible to measure the degree of parallelism and the degree of concentricity of a cylinder internal structure in a noncontact manner and in a simple way.

Furthermore, by using the common optical path OPC and the first optical path OP1 in the measuring head 73, it is possible to use the measuring head 73 as an autocollimator. That is, the eccentricity measuring device 70 may be a device that measures the amount of tilt in a lens frame without obtaining the amount of shift in a lens frame. In this case, it is possible to measure the amount of tilt for a plurality of measurement flat plates at the same time.

According to the present invention, it is possible to provide a measuring head with a wide range of measurement in the measurement axis direction and an eccentricity measuring device including the same.

As described above, the present invention is suitable for a measuring head with a wide range of measurement in the measurement axis direction and an eccentricity measuring device including the same.

What is claimed is:
1. An eccentricity measuring device comprising:
a body;
a moving mechanism;
a measuring head;
a holding member; and
a processor, wherein
the measuring head, the holding member, and the moving mechanism are provided in the body,
the measuring head and the holding member are positioned such that the measuring head and a subject held by the holding member are located on a measurement axis,
the moving mechanism moves at least one of the measuring head and the holding member in a direction along the measurement axis,
the processor is connected to the moving mechanism and the measuring head, and
the measuring head includes
a light source;
a first image sensor;
a second image sensor;
an objective optical system;
an optical path splitting element;
a common optical path;
a first optical path; and
a second optical path,
wherein the common optical path is formed from the optical path splitting element toward the objective optical system,
the first optical path is formed from the optical path splitting element toward the first image sensor, the second optical path is formed from the optical path splitting element toward the second image sensor, the common optical path is located on one side and the first optical path and the second optical path are located on the other side, with the optical path splitting element interposed therebetween, the optical path splitting element is disposed at a position where the first optical path and the second optical path intersect, the light source is disposed in the first optical path, the light source and the first image sensor are disposed at predetermined positions, the second image sensor is disposed at a position different from the predetermined positions, the predetermined positions are each a focal position of the objective optical system or a position conjugate to the focal position of the objective optical system, and the processor is configured to:
- measure the amount of tilt of the subject by using the image of the light source formed on the first image sensor, and
- measure the amount of shift by using the image of the subject formed on the second image sensor.

2. The eccentricity measuring device according to claim 1, wherein a distance from a subject disposed on the common optical path to the objective optical system is twice a focal length of the objective optical system.

3. The eccentricity measuring device according to claim 1, wherein the measuring head further comprising a reflective member in the second optical path.

4. The eccentricity measuring device according to claim 1, wherein the measuring head further comprising a magnifying optical system in the second optical path.

5. The eccentricity measuring device according to claim 1, wherein
the optical path splitting element is formed with a plane parallel plate, and
the measuring head further comprises a cylindrical lens in the second optical path.

6. The eccentricity measuring device according to claim 1, wherein the optical path splitting element has a dichroic mirror surface.

7. The eccentricity measuring device according to claim 1, wherein the measuring head further comprising an illumination light source in the second optical path.

8. The eccentricity measuring device according to claim 1, wherein the subject is a plane parallel plate having a reticle formed on a surface.

9. The eccentricity measuring device according to claim 8, wherein the processor is configured to:
measure the amount of tilt of the subject by using the amount of displacement from the certain position in the first image sensor for the image of the light source formed on the first image sensor, and
measure the amount of shift by using the amount of displacement from the certain position in the second image sensor for the image of the reticle formed on the second image sensor.

10. The eccentricity measuring device according to claim 9, wherein
the subject is at least one plane parallel plate which is held by at least one lens frame of a lens barrel having the at least one lens frame,
the processor is configured to:
measure an amount of tilt and an amount of shift of the at least one plane parallel plate by using the image of the light source formed on the first image sensor and the image of the reticle formed on the second image sensor, and
calculate the amount of tilt and the amount of shift of the at least one lens frame by using the amount of tilt and the amount of shift of the at least one plane parallel plate.

11. The eccentricity measuring device according to claim 9, further comprising a jig and a surface to be measured,
wherein the surface to be measured is disposed between the jig and the measuring head,
an image of the light source in the jig and an image of the light source in the surface to be measured are formed on the first image sensor, and an image of the reticle in the jig and an image of the reticle in the surface to be measured are formed on the second image sensor by irradiating light to the jig and the surface to be measured, and
the processor is configured to:
measure an amount of shift in the surface to be measured from a position of the image of the reticle in the jig and a position of the image of the reticle in the surface to be measured, and
calculate an amount of tilt in the surface to be measured from a position of the image of the light source in the jig and a position of the image of the light source in the surface to be measured.

12. The eccentricity measuring device according to claim 11, wherein
recordation of the position of the image of the reticle in the surface to be measured and recordation of the position of the image of the light source in the surface to be measured are repeatedly performed by moving the measuring head a number of times, and
the processor is configured to determine a surface to be measured at which the image of the reticle is formed on the second image sensor by comparing brightness of images of the light source formed on the first image sensor.

13. The eccentricity measuring device according to claim 10, wherein
the subject is plurality of plane parallel plates which are held by a plurality of lens frames of a lens barrel having the plurality of lens frames,
at least one of the measuring head and the holding member is moved along the measurement axis so that the image of each reticle of the plurality of plane parallel plates is formed on the second image sensor by the moving mechanism, and
the processor is configured to:
measure an amount of tilt and an amount of shift of the plurality of plane parallel plates by using the image of the light source formed on the first image sensor and the image of the reticle formed on the second image sensor, and
calculate the amount of tilt and the amount of shift of the plurality of lens frames which hold the plurality of lens frames by using the amount of tilt and the amount of shift of the plurality of plane parallel plates.

14. A eccentricity measuring method using a jig and a surface to be measured, the method comprising:
disposing the surface to be measured between the jig and the measuring head,
forming an image of the reticle in the jig, a spot image in the jig, an image of the reticle in the surface to be measured, and a spot image in the surface to be measured by irradiating light to the jig and the surface to be measured, moving a measuring head to a reference position, moving the measuring head to a position where the image of the reticle in the jig is formed on a second image sensor, storing a position of the image of the reticle in the jig, storing a position of a darkest spot image of spot images formed on a first image sensor as a position of the spot image in the jig, storing a position of the image of the reticle in the surface to be measured, storing a position of the spot image in the surface to be measured, the storing of the position of the image of the reticle in the surface to be measured and the storing of the position of the spot image in the surface to be measured are performed by moving the measuring head by the number of surfaces to be measured, measuring an amount of shift in the surface to be measured from a position of the image of the reticle in the jig and a position of the image of the reticle in the surface to be measured, and measuring an amount of tilt in the surface to be measured from a position of the spot image in the jig and a position of the spot image in the surface to be measured.

15. The eccentricity measuring device according to claim 14, wherein the storing of the position of the image of the reticle in the surface to be measured and the storing of the position of the spot image in the surface to be measured are repeatedly performed by moving the measuring head a number of times, and determining a surface to be measured when the image of the reticle is formed on the second image sensor by comparing brightness of images of the light source formed on the first image sensor.

* * * * *